United States Patent
Wang et al.

(10) Patent No.: US 9,294,467 B2
(45) Date of Patent: *Mar. 22, 2016

(54) SYSTEM AND METHOD TO ASSOCIATE A PRIVATE USER IDENTITY WITH A PUBLIC USER IDENTITY

(71) Applicant: A10 Networks, Inc., San Jose, CA (US)

(72) Inventors: Xin Wang, Fremont, CA (US); Lee Chen, Saratoga, CA (US); John Chiong, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,012

(22) Filed: May 22, 2015

(65) Prior Publication Data
US 2015/0312237 A1   Oct. 29, 2015

Related U.S. Application Data

(63) Continuation of application No. 14/056,785, filed on Oct. 17, 2013, now Pat. No. 9,060,003, which is a continuation of application No. 13/153,385, filed on Jun. 3, 2011, now Pat. No. 8,595,383, which is a
(Continued)

(51) Int. Cl.
   G06F 15/16 (2006.01)
   H04L 29/06 (2006.01)
   (Continued)

(52) U.S. Cl.
   CPC ............... *H04L 63/08* (2013.01); *H04L 29/06* (2013.01); *H04L 61/6022* (2013.01);
   (Continued)

(58) Field of Classification Search
   CPC .................................................... H04L 63/08
   USPC ............................................... 709/249
   See application file for complete search history.

(56) References Cited

U.S. PATENT DOCUMENTS

| 5,541,994 A | 7/1996 | Tomko et al. |
| 5,712,912 A | 1/1998 | Tomko et al. |

(Continued)

FOREIGN PATENT DOCUMENTS

| CN | 1449618 | 10/2003 |
| CN | 101361037 | 2/2009 |

(Continued)

OTHER PUBLICATIONS

"How to Create a Rule in Outlook 2003" CreateaRule-Outlook2003. doc 031405 mad.
(Continued)

*Primary Examiner* — Peter Shaw
(74) *Attorney, Agent, or Firm* — Carr & Ferrell LLP

(57) ABSTRACT

The inventive system includes a host, a network including a security gateway, and a public application. Established are an access session between the network and the host and an application session between the public application and the network. An application session record is created for the application session, and includes the user's public user identity used to access the public application, the user's private user identity used to access the network, a host identity, and an application session time, To determine the private user identity for the application session, the security gateway sends a query with the host identity and the application session time. These are compared with the host identity and access session time in an access session record, if they match, then the private user identity in the access session record is returned, and it is stored as the private user identity in the application session record.

21 Claims, 8 Drawing Sheets

Related U.S. Application Data continuation of application No. 12/771,491, filed on Apr. 30, 2010, now Pat. No. 7,979,585, which is a continuation of application No. 11/582,613, filed on Oct. 17, 2006, now Pat. No. 7,716,378.

(51) Int. Cl.
  *H04L 29/08* (2006.01)
  *H04L 29/12* (2006.01)

(52) U.S. Cl.
  CPC ........... *H04L 61/6068* (2013.01); *H04L 63/04* (2013.01); *H04L 63/10* (2013.01); *H04L 63/30* (2013.01); *H04L 65/1003* (2013.01); *H04L 65/1006* (2013.01); *H04L 65/1069* (2013.01); *H04L 65/4007* (2013.01); *H04L 67/14* (2013.01); *H04L 67/141* (2013.01); *H04L 67/146* (2013.01)

(56) References Cited

U.S. PATENT DOCUMENTS

| | | |
|---|---|---|
| 5,737,420 A | 4/1998 | Tomko et al. |
| 5,757,916 A | 5/1998 | MacDoran et al. |
| 5,832,091 A | 11/1998 | Tomko et al. |
| 5,991,408 A | 11/1999 | Pearson et al. |
| 6,035,398 A | 3/2000 | Bjorn |
| 6,167,517 A | 12/2000 | Gilchrist et al. |
| 6,182,146 B1 | 1/2001 | Graham-Cumming, Jr. |
| 6,182,221 B1 | 1/2001 | Hsu et al. |
| 6,219,793 B1 | 4/2001 | Li et al. |
| 6,219,794 B1 | 4/2001 | Soutar et al. |
| 6,310,966 B1 | 10/2001 | Dulude et al. |
| 6,317,834 B1 | 11/2001 | Gennaro et al. |
| 6,490,624 B1 | 12/2002 | Sampson et al. |
| 6,507,912 B1 | 1/2003 | Matyas, Jr. et al. |
| 6,714,931 B1 | 3/2004 | Papierniak et al. |
| 6,748,084 B1 | 6/2004 | Gau et al. |
| 6,901,145 B1 | 5/2005 | Bohannon et al. |
| 6,950,651 B2 | 9/2005 | Seligmann |
| 7,095,852 B2 | 8/2006 | Wack et al. |
| 7,133,916 B2 | 11/2006 | Schunemann |
| 7,155,514 B1 | 12/2006 | Milford |
| 7,237,267 B2 | 6/2007 | Rayes et al. |
| 7,360,237 B2 | 4/2008 | Engle et al. |
| 7,376,969 B1 | 5/2008 | Njemanze et al. |
| 7,480,934 B2 | 1/2009 | Chan et al. |
| 7,484,089 B1 | 1/2009 | Kogen et al. |
| 7,551,574 B1 | 6/2009 | Peden, II et al. |
| 7,552,126 B2 | 6/2009 | Chen et al. |
| 7,613,829 B2 | 11/2009 | Alve |
| 7,647,635 B2 | 1/2010 | Chen et al. |
| 7,653,633 B2 | 1/2010 | Villella et al. |
| 7,716,378 B2 | 5/2010 | Chen et al. |
| 7,804,956 B2 | 9/2010 | Chang et al. |
| 7,979,585 B2 | 7/2011 | Chen et al. |
| 8,104,091 B2 | 1/2012 | Qin et al. |
| 8,122,152 B2 | 2/2012 | Chittenden et al. |
| 8,151,322 B2 | 4/2012 | Chen et al. |
| 8,423,676 B2 | 4/2013 | Chen et al. |
| 8,595,383 B2 | 11/2013 | Chen et al. |
| 8,782,751 B2 | 7/2014 | Chen et al. |
| 8,813,180 B1 | 8/2014 | Chen et al. |
| 8,868,765 B1 | 10/2014 | Chen et al. |
| 8,903,986 B1 | 12/2014 | Newstadt et al. |
| 9,060,003 B2 | 6/2015 | Wang et al. |
| 9,122,853 B2 | 9/2015 | Thompson |
| 2001/0022558 A1 | 9/2001 | Karr, Jr. et al. |
| 2002/0095587 A1 | 7/2002 | Doyle et al. |
| 2003/0023874 A1 | 1/2003 | Prokupets et al. |
| 2003/0101349 A1 | 5/2003 | Wang |
| 2003/0105859 A1 | 6/2003 | Garnett et al. |
| 2003/0140232 A1 | 7/2003 | De Lanauze |
| 2003/0140235 A1 | 7/2003 | Immega et al. |
| 2003/0191989 A1 | 10/2003 | O'Sullivan |
| 2003/0219121 A1 | 11/2003 | van Someren |
| 2004/0015243 A1 | 1/2004 | Mercredi et al. |
| 2004/0034784 A1 | 2/2004 | Fedronic et al. |
| 2004/0049687 A1 | 3/2004 | Orsini et al. |
| 2004/0059924 A1 | 3/2004 | Soto et al. |
| 2004/0081173 A1 | 4/2004 | Feather |
| 2004/0153553 A1 | 8/2004 | Chotkowski et al. |
| 2004/0167912 A1 | 8/2004 | Tsui et al. |
| 2004/0194114 A1 | 9/2004 | Spiegel |
| 2004/0224664 A1 | 11/2004 | Guo |
| 2004/0242200 A1 | 12/2004 | Maeoka et al. |
| 2004/0254919 A1 | 12/2004 | Giuseppini |
| 2004/0260651 A1* | 12/2004 | Chan .................... G06F 21/41 705/50 |
| 2005/0009520 A1 | 1/2005 | Herrero et al. |
| 2005/0010930 A1 | 1/2005 | Vaught |
| 2005/0018618 A1 | 1/2005 | Mualem et al. |
| 2005/0086502 A1 | 4/2005 | Rayes et al. |
| 2005/0089048 A1 | 4/2005 | Chittenden et al. |
| 2005/0108518 A1 | 5/2005 | Pandya |
| 2005/0114186 A1 | 5/2005 | Heinrich |
| 2005/0114321 A1 | 5/2005 | DeStefano et al. |
| 2005/0144480 A1 | 6/2005 | Kim et al. |
| 2005/0182969 A1 | 8/2005 | Ginter et al. |
| 2005/0204162 A1 | 9/2005 | Rayes et al. |
| 2005/0283609 A1 | 12/2005 | Langford |
| 2006/0069687 A1 | 3/2006 | Cui et al. |
| 2006/0077926 A1 | 4/2006 | Rune |
| 2006/0083372 A1 | 4/2006 | Chang et al. |
| 2006/0140452 A1 | 6/2006 | Raynor et al. |
| 2006/0165226 A1 | 7/2006 | Ernst et al. |
| 2006/0173977 A1 | 8/2006 | Ho et al. |
| 2007/0011300 A1 | 1/2007 | Hollebeek et al. |
| 2007/0032247 A1 | 2/2007 | Shaffer et al. |
| 2007/0067441 A1 | 3/2007 | Pomerantz |
| 2007/0067838 A1 | 3/2007 | Bajko |
| 2007/0121560 A1 | 5/2007 | Edge |
| 2007/0179986 A1 | 8/2007 | Adam |
| 2007/0180101 A1 | 8/2007 | Chen et al. |
| 2007/0206746 A1 | 9/2007 | Andreasson et al. |
| 2007/0271598 A1 | 11/2007 | Chen et al. |
| 2007/0282855 A1 | 12/2007 | Chen et al. |
| 2007/0283141 A1 | 12/2007 | Pollutro et al. |
| 2007/0294209 A1 | 12/2007 | Strub et al. |
| 2008/0002684 A1 | 1/2008 | Kumazawa et al. |
| 2008/0080398 A1 | 4/2008 | Yasuie et al. |
| 2008/0104276 A1 | 5/2008 | Lahoti et al. |
| 2008/0109887 A1 | 5/2008 | Chen et al. |
| 2008/0130898 A1 | 6/2008 | Holtmanns et al. |
| 2008/0148357 A1 | 6/2008 | Chen et al. |
| 2008/0229418 A1 | 9/2008 | Chen et al. |
| 2008/0263626 A1 | 10/2008 | Bainter et al. |
| 2009/0047952 A1 | 2/2009 | Giaretta et al. |
| 2009/0213763 A1 | 8/2009 | Dunsmore et al. |
| 2009/0292924 A1 | 11/2009 | Johnson et al. |
| 2010/0153544 A1 | 6/2010 | Krassner et al. |
| 2010/0159955 A1 | 6/2010 | Aerrabotu |
| 2010/0217819 A1 | 8/2010 | Chen et al. |
| 2011/0055913 A1 | 3/2011 | Wong |
| 2011/0239289 A1 | 9/2011 | Wang et al. |
| 2012/0204236 A1 | 8/2012 | Chen et al. |
| 2012/0216266 A1 | 8/2012 | Wang et al. |
| 2013/0036342 A1 | 2/2013 | Deo et al. |
| 2014/0059702 A1 | 2/2014 | Wang et al. |
| 2014/0143149 A1 | 5/2014 | Aissi |
| 2014/0229268 A1 | 8/2014 | Clapp et al. |
| 2014/0347479 A1 | 11/2014 | Givon |
| 2014/0380424 A1 | 12/2014 | Thompson |
| 2015/0012746 A1 | 1/2015 | Kulkarni et al. |

FOREIGN PATENT DOCUMENTS

| | | |
|---|---|---|
| CN | 101375253 | 2/2009 |
| CN | 102098316 | 6/2011 |
| CN | 102123156 | 7/2011 |
| CN | ZL2007800017956 | 7/2011 |
| CN | ZL2007800017759 | 9/2011 |
| CN | ZL2011100683067 | 11/2014 |
| CN | ZL2011100683090 | 9/2015 |

(56) References Cited

FOREIGN PATENT DOCUMENTS

| TW | NI175810 | 4/2003 |
|---|---|---|
| TW | I249314 | 2/2006 |
| WO | WO0221788 | 3/2002 |
| WO | WO2008067013 | 6/2008 |
| WO | WO2008070248 | 6/2008 |
| WO | WO2014209660 | 12/2014 |

OTHER PUBLICATIONS

WFLOGS, Dec. 15, 2002, http://web.archive.org/web/20021205151706/http://www.wallfire.org/wflogs/wflogs.8.html.

Microsoft Windows XP—Filter events in an event log, Jul. 2, 2004, http://web.archive.org/web/20040702070538/http://www.microsoft.com/resources/documentation/windows/xp/all/proddocs/en-us/nt_filteringevents_how_ev.mspx.

The Cable Guy: Windows 2000 Routing and Remote Access Service—Jun. 2001, Jul. 22, 2004, http://web.archive.org/web/20040722111534/http://www.microsoft.com/technet/community/columns/cableguy/cg0601.mspx.

Monrose et al., "Cryptographic Key Generation from Voice," Proceedings of the 2001 IEEE Symposium on Security and Privacy, pp. 202-213, May 2001.

Shamir, "How to share a secret," Communications of the ACM, vol. 22, No. 11, pp. 612-613, Nov. 1979.

Jermyn et al., "The Design and Analysis of Graphical Passwords," 8th USENIX Security Symposium ; Aug. 1999; 15 pp.

Soutar et al.; "Biometric Encryption™"; 1999; pp. 1-28.

Duda et al., "Pattern Classification," Second Edition; 2001; pp. 117-121.

Zhang et al.; "Personal Authentication Based on Generalized Symmetric Max Minimal Distance in Subspace;" 2003; IEEE; pp. 245-248.

Okada et al.; "An Optimal Orthonormal System for Discriminant Analysis"; 1985; Pattern Recognition, vol. 18, No. 2; pp. 139-144.

Chang et al.; "Biometrics-Based Cryptographic Key Generation;" In Multimedia and Expo, Jun. 2004. ICME'04. 2004 IEEE International Conference on (vol. 3, pp. 2203-2206). IEEE.

Zhang et al.; "Optimal Thresholding for Key Generation Based on Biometrics;" In Image Processing, Oct. 2004. ICIP'04. 2004 International Conference on (vol. 5, pp. 3451-3454). IEEE.

Maradon, How to Build a Web Sidget (Using jQuery)—Alex Marandon, Jun. 2010, https://web.archive.org/web/20100623004301/http://alexmarandon.com/articles/web_widget_jquery/.

* cited by examiner

SYSTEM AND METHOD TO ASSOCIATE A PRIVATE USER IDENTITY WITH A PUBLIC USER IDENTITY

CROSS REFERENCE TO RELATED APPLICATIONS

The present patent application is a continuation of U.S. patent application Ser. No. 14/056,785, entitled "System and Method to Associate a Private User Identity with a Public User Identity", filed on Oct. 17, 2013 (now U.S. Pat. No. 9,060,003, issued on Jun. 16, 2015), which is a continuation of U.S. application Ser. No. 13/153,385, entitled "System and Method to Associate a Private User Identity with a Public User Identity", filed on Jun. 3, 2011 (now U.S. Pat. No. 8,595,383, issued on Nov. 26, 2013), which is a continuation of U.S. application Ser. No. 12/771,491, entitled "System and Method to Associate a Private User Identity with a Public User Identity", filed on Apr. 30, 2010 (now U.S. Pat. No. 7,979,585, issued on Jul. 12, 2011), which is a continuation of U.S. application Ser. No. 11/582,613, entitled "System and Method to Associate a Private User Identity with a Public User Identity", filed on Oct. 17, 2006 (now U.S. Pat. No. 7,716,378, issued on May 11, 2010). The disclosures of each of the above referenced applications are incorporated herein by reference in their entirety.

FIELD OF THE INVENTION

This invention relates generally to data networking, and more specifically, to a system and method to associate a public user identity with a private user identity during an application session.

BACKGROUND OF THE INVENTION

The secure data network of a company is a critical component for day-to-day functioning of company business activities. Company employees access the secure data network for communication within the company and with the outside world. Company information, oftentimes proprietary or confidential, is exchanged during the communication.

Typically, an employee gains access to the company's secure data network by means of a network logon procedure using a private user identity, such as a user name "Robert P. Williamson" or an employee number "NGO1-60410", Subsequent information exchange using the company's office applications, such as email, file transfer or document control is traceable based on the private user identity through network event logs.

Since the late 1990's, we have been witnessing the phenomenal rising popularity of public communication services, such as email and Instant Messaging offered by Yahoo™, America Online™ (AOL), or Google™, conferencing and collaboration services offered by Webex™ or Centra™, or peer-to-peer services for a variety of file sharing. Generally, a public communication service allows a user to exchange information through messaging, text chat or document exchange using a public user identity, such as "butterdragon", "fingernail 1984", or "peterrabbit".

However, in a company setting, when an employee connects to a public communication service with a public user identity over the company's secure data network, the information exchange is not easily traceable if at all since the public user identity is not tied to the private user identity.

In one example, a company's information technology (IT) department notices that an employee Victor has been using the company's email system to send out proprietary documents, violating the company's security policy. After issuing a warning to Victor, the IT department finds no further violations. Unfortunately, they are not aware of the fact that Victor has continued this activity using Yahoo™ email with a public user identity "PiratesOfCaribbean®Yahoo.com", In another example, two weeks before a major trade show, a company implements a security measure to monitor communication activities of employees of director level and above to ensure confidentiality of competitive information. This security measure, covering company email, phone conversation and voice messaging, nevertheless proves to be a failure as sensitive information leaks out to a business reporter anyway prior to the trade show. The source of the leak may never be confirmed, but the business reporter privately discloses that he gets the information from an anonymous employee of the company using AOL Instant Messaging™ with screen name "opensecret2006".

The above discussion illustrates the need for a solution to associate a public user identity to a private user identity.

BRIEF SUMMARY OF THE INVENTION

A system and method for associating a private user identity with a public user identity is disclosed. The system includes a host, a network which includes a security gateway, and a public application residing externally to the network. An access session is established between the network and the host. An application session is established between the public application and the network via the security gateway, and an application session record is created for it. The application session record includes the user's public user identity, used to access the public application, and the user's private user identity, used for accessing the network through the host. It further includes a host identity, and an application Session time. To determine the private user identity for the application session, the security gateway queries an identity server, on which the access session record resides. The host identities in the application and access session records are then compared, as well as the access session time with the application session time. If they match, then the private user identity in the access session record is returned to the security gateway, which stores it as the private user identity in the application session record.

BRIEF DESCRIPTION OF DRAWING FIGURES

DETAILED DESCRIPTION OF THE INVENTION

Figure 1A:
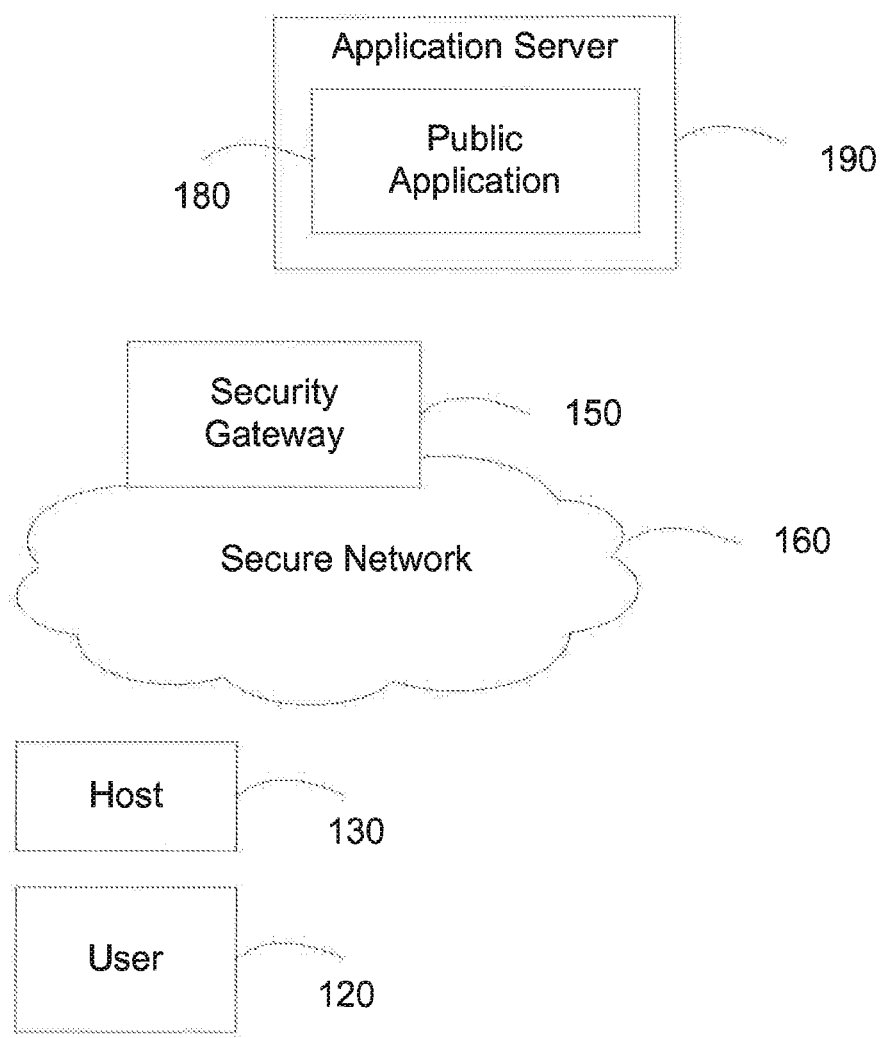
FIG. 1A illustrates a secure network.

FIG. 1A illustrates a secure network.

A secure network 160 includes a host 130. User 120 uses host 130 to access a public application 180 hosted in application server 190. Application server 190 is outside of secure network 160. The network traffic between host 130 and application server 190 passes through security gateway 150.

Host 130 is a computing device with network access capabilities. In one embodiment, host 130 is a workstation, a desktop personal computer or a laptop personal computer. In one embodiment, host 130 is a Personal Data Assistant (FDA), a smartphone, or a cellular phone.

In one embodiment, secure network 160 is an Internet Protocol (IP) network. In one embodiment, secure network 160 is a corporate data network or a regional corporate data network, In one embodiment, secure network 160 is an Internet service provider network. In one embodiment, secure network 160 is a residential data network. In one embodiment, secure network 160 includes a wired network such as Ethernet. In one embodiment, secure network 160 includes a wireless network such as a WiFi network.

Public application 180 provides a service that allows user 120 to communicate with other users in a real-time fashion. In one embodiment, the service includes text chat. In one embodiment, the service includes a voice call or a video call. In one embodiment, the service includes a network game. In one embodiment, the service includes exchanging a document, such as sending or receiving a text document, a PowerPoint presentation, an Excel spreadsheet, an image file, a music file or a video clip.

In one example, public application 180 provides America Online Instant Messenger™ service. In one example, public application 180 provides Yahoo Instant Messenger™ voice service. In one embodiment, public application 180 provides a file sharing service such Kazaa™ file sharing service. In one embodiment, public application 180 provides a network game service such as Microsoft™ Network Game service.

Security gateway 150 is situated at the edge of secure network 160. Security gateway 150 connects secure network 160 to public application 180. Security gateway 150 receives network traffic from secure network 160 and transmits the network traffic to application server 190. Likewise, security gateway 150 receives network traffic from application server190 and transmits the network traffic to secure network 160.

In one embodiment, security gateway 150 includes the function of corporate Wide Area Network (WAN) gateway. In one embodiment, security gateway 150 includes the function of a residential broadband gateway. In one embodiment, security gateway 150 includes the function of a WAN gateway for an Internet service provider.

Figure 1B:
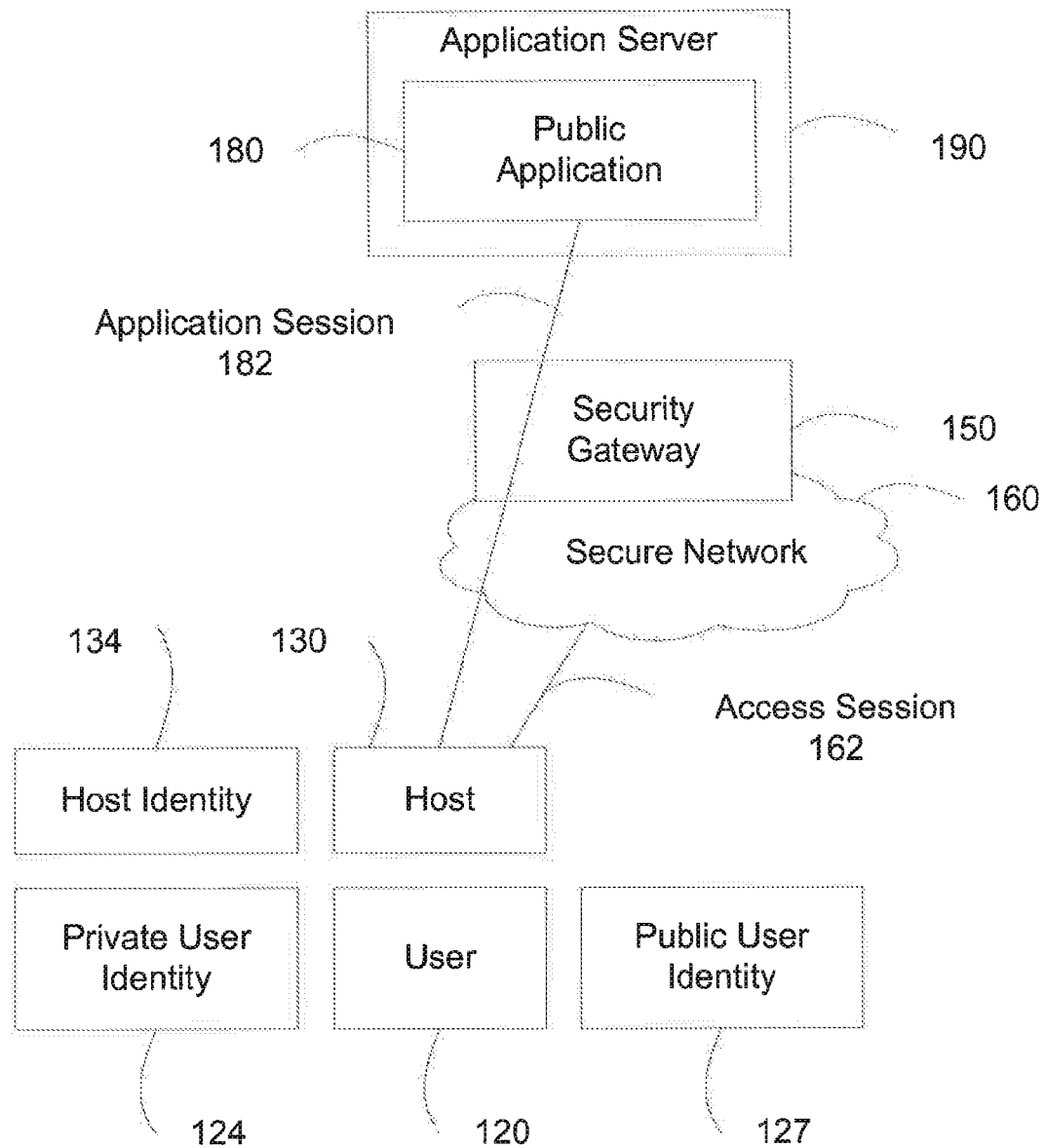
FIG. 1B illustrates an access session and an application session.

FIG. 1B illustrates an access session and an application session.

User 120 uses host 130 to access secure network 160 during an access session 162.

Host 130 has a host identity 134. Host 130 uses host identity 134 to connect to secure network 160. In one embodiment, host identity 134 includes an IP address. In one embodiment, host identity 134 includes a Media Access Control (MAC) address.

Within secure network 160, user 120 has a private user identity 124. In one embodiment, private user identity 124 is an employee number or an employee name. In one embodiment, private user identity 124 is an Internet service subscription identity. In one embodiment, access session 162 is established after a successful network user log-in procedure, such as an employee network log-in, for secure network 160 using private user identity 124. Private user identity 124 is associated with host identity 134.

User 120 uses host 130 to access public application 180 in an application session 182. User 120 uses a public user identity 127 during application session 182. In one embodiment, public application 180 prompts user 120 to log-in before establishing application session 182. During the application user log-in procedure, user 120 provides to public application 180 public user identity 127. In another embodiment, public application 180 selects a public user identity 127 for user 120 for application session 182. In one embodiment, public user identity 127 is set up through a user registration process or a service subscription process. Network traffic in application session 182 passes through security gateway 150.

Figure 1C:
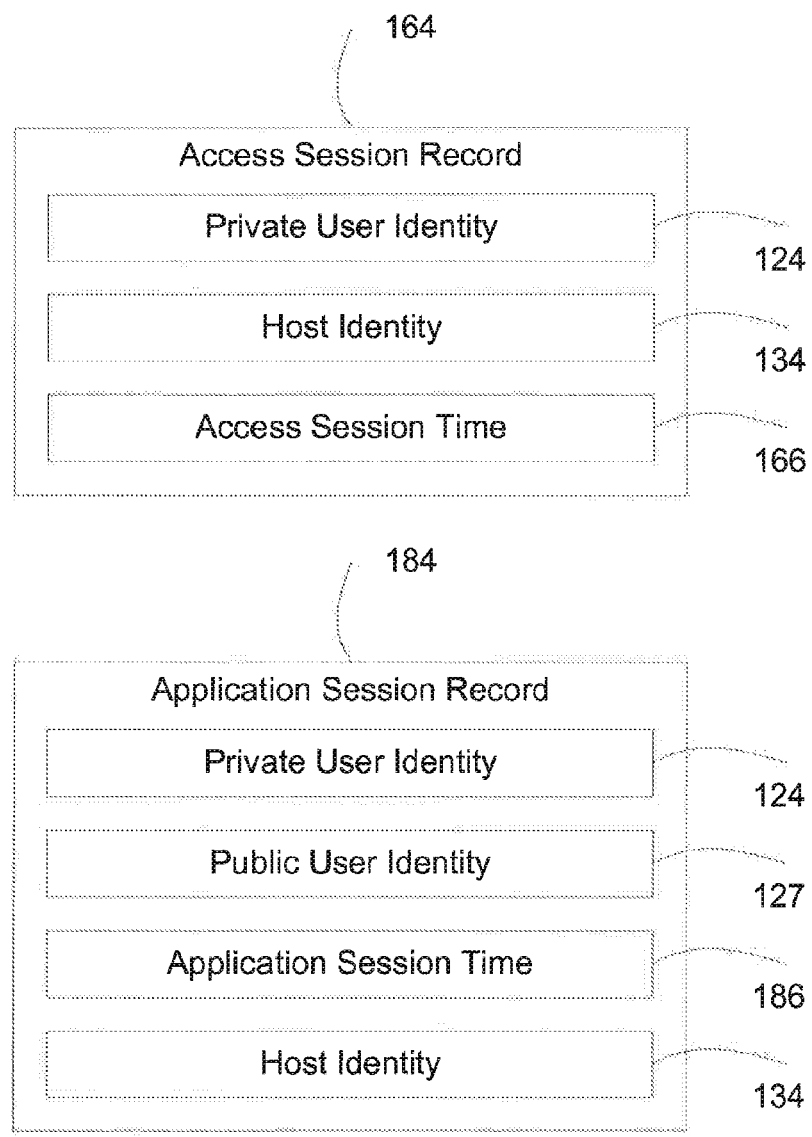
FIG. 1C illustrates an access session record and an application session record.

FIG. 1C illustrates an access session record and an application session record.

Access session record 164 records information about access session 162. The information includes private user identity 124, host identity 134 and access session time 166. In one embodiment, access session time 166 is the starting time when access session 162 is established. In one embodiment, access session time 166 includes the starting time and the ending time when user 120 finishes access session 162.

Application session record 184 records information, about application session 182. The information includes private user identity 124, public user identity 127, and application, session time 186. In one embodiment, the information further includes host identity 134. In one embodiment, application session time 186 includes the starting time when application session 182 is established. In one embodiment, application session time 186 includes a time stamp during application session 182. In. one embodiment, application session time 186 includes a time stamp when security gateway 150 recognizes application session 182.

Figure 2:
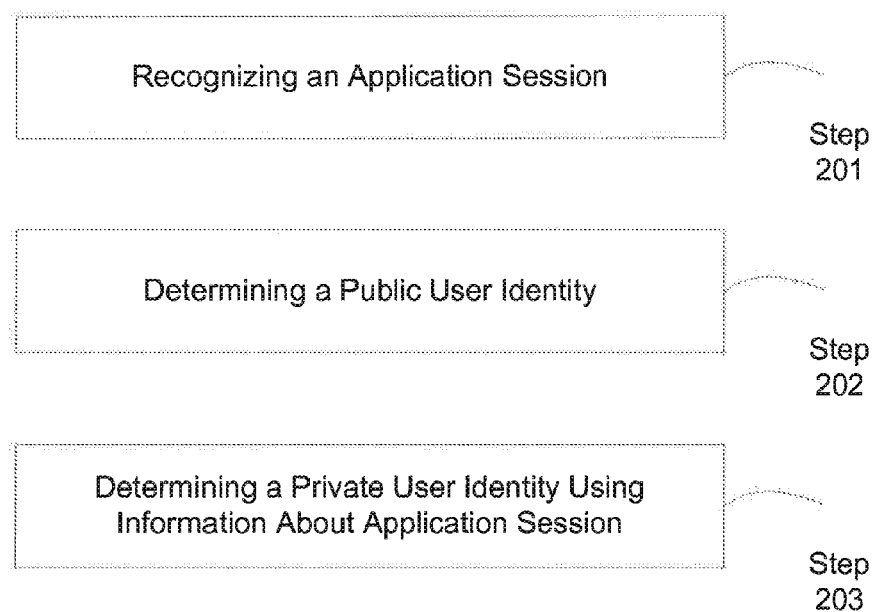
FIG. 2 illustrates a process to generate an application session record.

FIG. 2 illustrates a process to generate an application session record.

The process of generating application session record 184 includes multiple steps, in step 201, security gateway 150 recognizes an application session.

In step 202, security gateway 150 determines a public user identity of the application session.

In step 203, security gateway 150 determines a private user identity using information about the application session.

Figure 3:
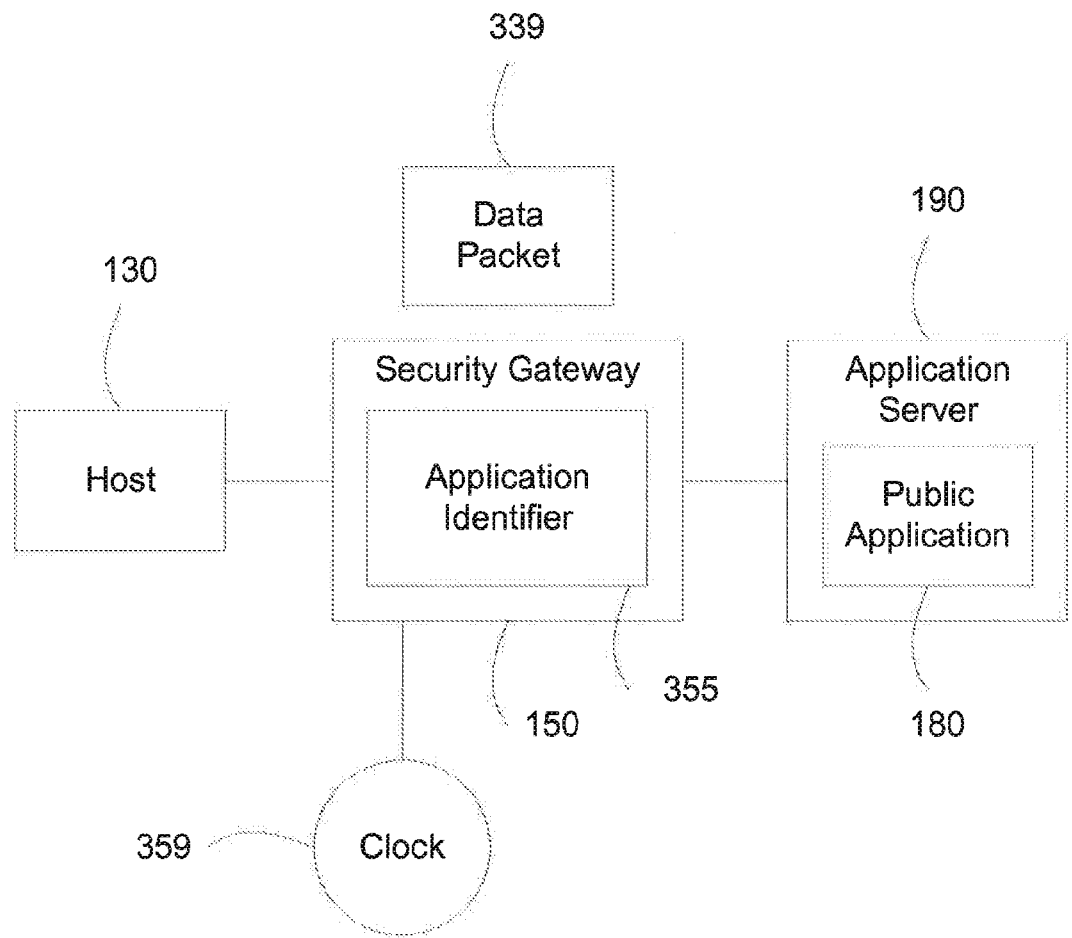
FIG. 3 illustrates a process to recognize an application session.
Figure 4A:
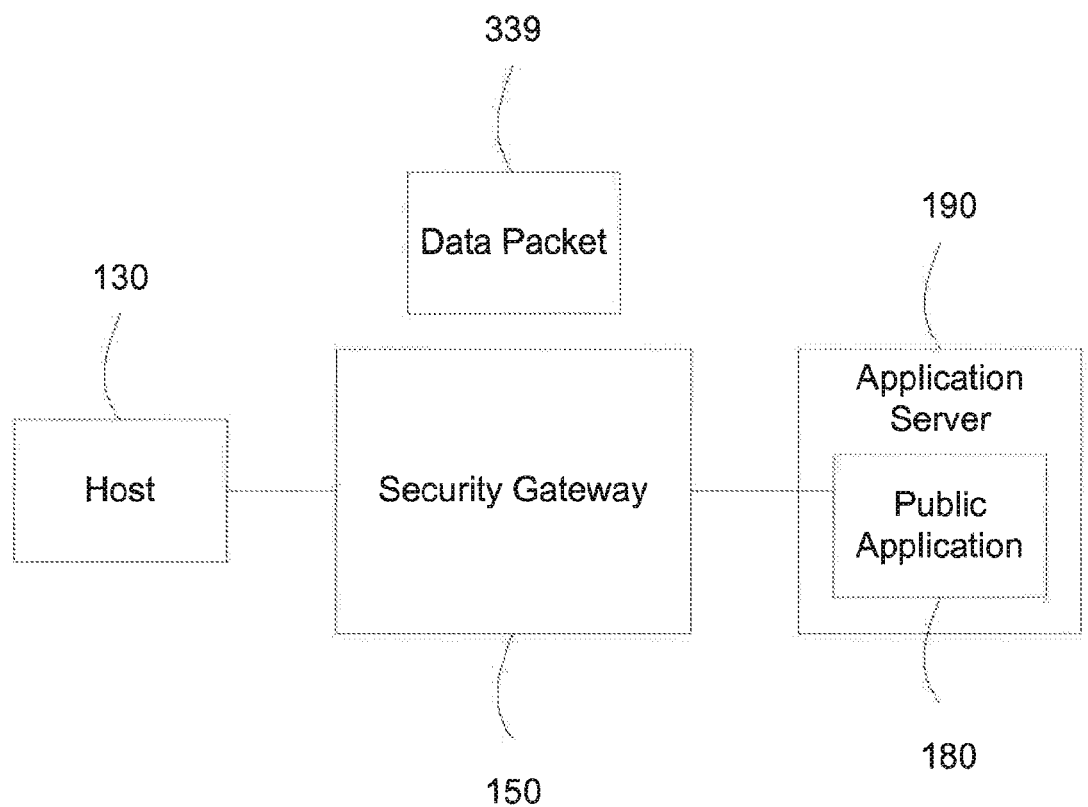
FIG. 4A illustrates a process to determine a public user identity of application session.
Figure 4B:
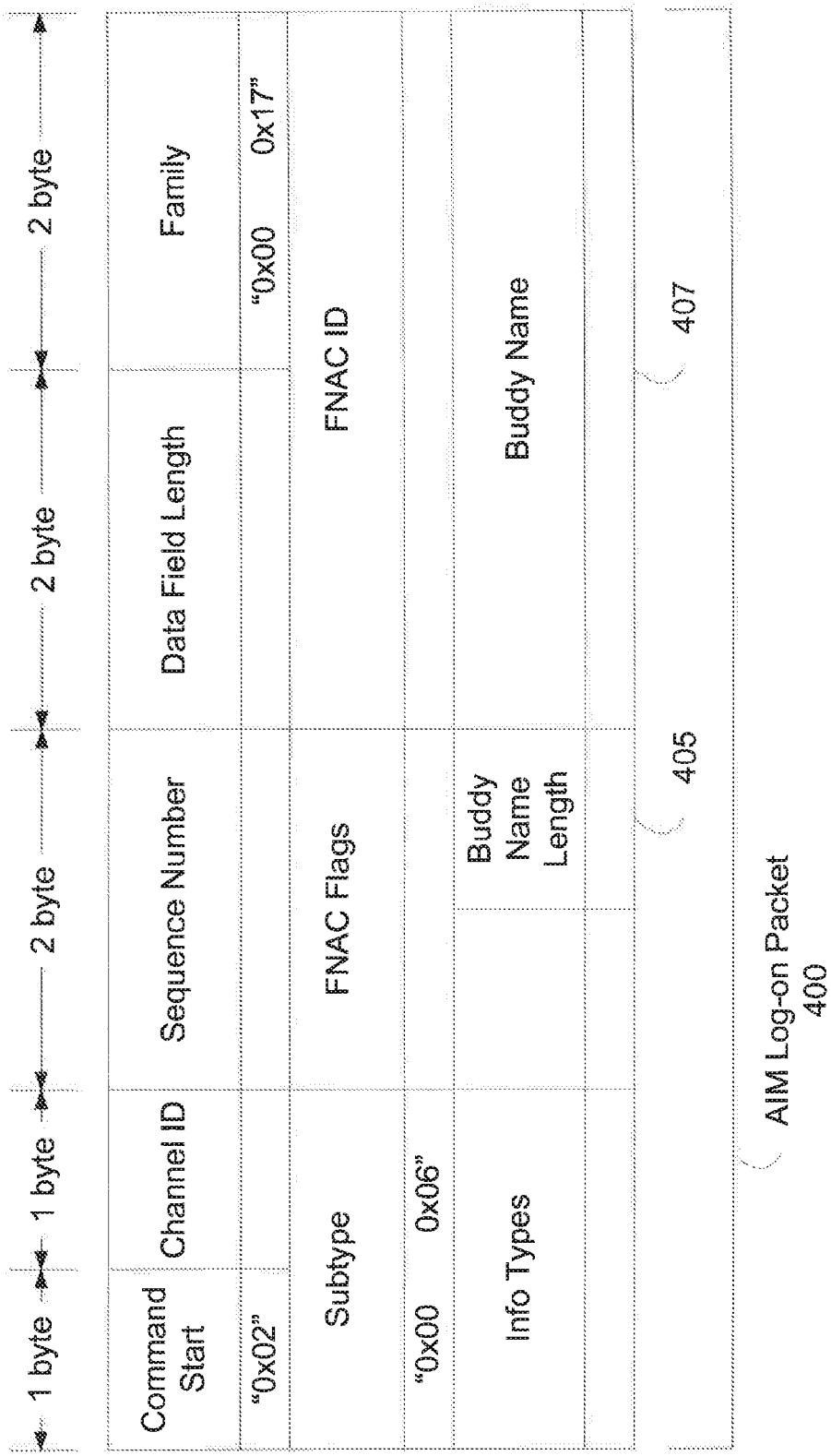
FIG. 4B illustrates a data packet in an AIM log-on packet.
Figure 5:
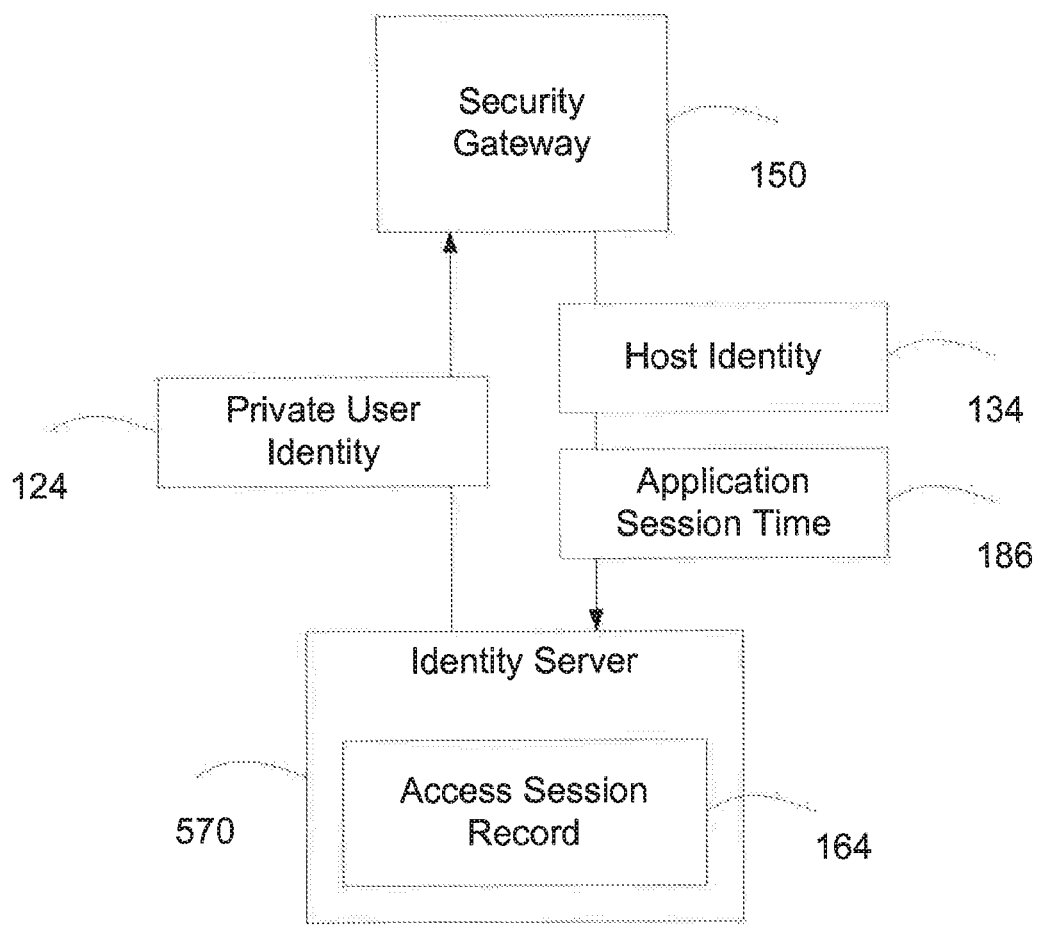
FIG. 5 illustrates a process to determine a private user identity.

FIGS. 3-5 illustrate steps 201-203 respectively.

FIG. 3 illustrates a process to recognize an application session.

Security gateway 150 inspects network traffic between host 130 and application server 190 to recognize application session 182 for public application 180.

In one embodiment, security gateway 150 inspects data packet 339 between host 130 and application server 190 for the recognition of application session 182, Security gateway 150 includes an application identifier 355 for public application 180. Application identifier 355 includes information for recognizing application session 182. in one embodiment, application identifier 355 includes a transport layer information, such as Transmission Control Protocol (TCP) or User Diagram Protocol (UDP); and at least one transport port number, such as a TCP port number or a UDP port number. In one embodiment, application. identifier 355 includes application layer information, such as one or more data filters wherein a data filter specifies a value and a position of the value in a data packet. In one example, a data filter is [byte 0 with value "0x52"]. In one example, a data filter is [byte 4-7 with ASCII value of "ADEH"].

Security gateway 150 matches data packet 339 against application identifier 355.

In one embodiment, application identifier 355 includes transport protocol type of TCP and a destination TCP port number of 5190, the TCP port number used by AIM protocol.

In this embodiment, data packet 339 is a TCP packet from host 130 to application server 190. Security gateway 150 matches data packet 339 against application identifier 355 and determines that public application 180 provides AIM service.

Security gateway 150 creates application session record 184, Security gateway 150 extracted the source IP address from the IP header of data packet 339, and stores the source IP address as host identity 134. In one embodiment, data packet 339 includes link layer information, such as a source MAC address; security gateway 150 extracts and stores the source MAC address as host identity 134.

In one embodiment, security gateway 150 connects to a clock 359. Clock 359 indicates the current time of day, Security gateway 150 stores the time of day indicated by clock 359 in application session time 186.

FIG. 4A illustrates a process to determine a public user identity of application session 182.

The method for determining public user identity 127 is typically specific to public application 180. In one embodiment, data packet 339 is an application packet. For example, public application 180 provides AIM service; data packet 339 is an AIM packet.

An AIM packet includes multiple fields, for example
Command start field is a 1-byte data field starting at byte offset 0 haying a fixed hexadecimal value "0x02";
Channel ID field is a 1-byte data field starting at byte offset 1;
Sequence number field is a 2-byte integer starting at byte offset 2;
Data field length field is a 2-byte data field starting at byte offset 4;
Family field is a 2-byte data field starting at byte offset 6; and
Subtype field is a 2-byte data field starting at byte offset 8.

An AIM log-on packet is an AIM packet with family field having a fixed hexadecimal value of "0x00 0x1?" and subtype field having a fixed hexadecimal value of "0x00 0x06".

AIM log-on packet further includes buddy name length field, a 1-byte integer starting at byte offset 19, and a variable length buddy name field starting at byte offset 20. Buddy name length field indicates the length in bytes of buddy name field.

Security gateway 150 matches data packet 339 to determine if data packet 339 is an AIM log-on packet. In one embodiment, data packet 339 is an AIM log-on packet 400 illustrated in FIG. 4B. Security gateway 150 extracts buddy name length field 405, Security gateway 150 furthers extracts buddy name field 407. in this embodiment, buddy name length field 405 is integer "13" and buddy name field 407 is "JohnSmith1984". Security gateway 150 stores "JohnSmith1984" as public user identity 127 in application session record 184.

In one embodiment, data packet 339 is not an AIM log-on packet. Security gateway 150 inspects another data packet from host 130.

FIG. 5 illustrates a process to determine a private user identity.

Secure network 160 includes an identity server 570. Identity server 570 includes access session record 164 of access session 162 during which user 120 accesses application session 182.

Security gateway 150 queries identity server 570. Security gateway 150 sends host identity 134 and application session time 186 to identity server 570.

Identity server 570 receives host identity 134 and application session time 186. Identity server 570 matches host identity 134 and application session time 186 against access session record 164, Identity server 570 determines that host identity 134 matches host identity of access session record 164. Identity server 570 further determines that application session time 186 matches access session time 166 of access session record 164 as application session time 186 is between the starting time and the ending time of access session record 164, Identity server 570 sends private user identity 124 of access session record 164 to security gateway 150 as a response to the query.

Security gateway 150 receives private user identity 124 from identity server 570, and stores private user identity 124 in application session record 184.

In one embodiment, security gateway 150 stores public user identity 127 in application session record 184 after recognizing a log-on approval indication, for the public user identity 127 from public application 180.

In one embodiment, security gateway 150 queries identity server 570 immediately after determining public user identity127. In one embodiment, security gateway 150 queries identity server 570 after application session 182 ends.

In one embodiment, security gateway 150 queries identity server 570 by sending a plurality of host identities in a bulk request; and receives a plurality of private user identities in a bulk response.

In one embodiment, application session record 184 includes additional user information associated with private user identity 124, such as cubicle or office number, cubicle or office location, telephone number, email address, mail-drop location, department name/identity, or manager name, In one embodiment, security gateway 150 obtains the additional user information from identity server 570. In one embodiment, security gateway 150 obtains the additional user information by querying a different server, such as a corporate directory server, by using the private user identity 124 received from identity server 570.

In one embodiment, security gateway 150 generates a security report based on application session record 184. In one embodiment, security gateway 150 generates a security report based on a pre-defined private user identity or a list of pre-defined private user identities. In one embodiment, security gateway 150 generates a security report based on a pre-defined schedule or when requested by an operator. In one embodiment, security gateway 150 generates a security report based on corporate security policy.

In one embodiment, public application 180 provides file transfer service using File Transfer Protocol (FTP) protocol or a proprietary protocol. In one embodiment, public application 180 provides email service using Simple Mail Transfer Protocol (SMTP), Internet Message Access Protocol (MAP) or Post Office Protocol version 3 (POP3) protocol.

Foregoing described embodiments of the invention are provided as illustrations and descriptions. They are not intended to limit the invention to precise form described. In particular, it is contemplated that functional implementation of invention described herein may implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by claims following.

What is claimed is:

1. A communications system comprising:
   at least one network connection communicatively coupled to a secure network; and a processor communicatively coupled to the at least one network connection, the processor executing instructions to perform a method, the method including:

conveying an application session between a first host and an application server, the first host communicating with the application server using an application session, the application server provisioning an application;

ascertaining a first host identity associated with the first host, a first user identity associated with the application session, and an application session time associated with the application session;

receiving a second host identity associated with a second host, a second user identity associated with an access session, and an access session time associated with the application session, the second host communicating with the secure network using the access session, the access session time including a starting time and an ending time associated with the access session;

comparing the application session time and the access session time;

matching the first host identity with the second host identity, in response to the application session time being between the starting time and the ending time;

associating the first user identity and the second user identity using the matching; and storing the association.

2. The communications system of claim 1 wherein the application server is outside of the secure network.

3. The communications system of claim 1 wherein the application session is an authenticated access session and the access session is an authenticated access session.

4. The communications system of claim 1 wherein the application includes at least one of File Transfer Protocol (FTP), Simple Mail Transfer Protocol (SMTP), Internet Message Access Protocol (IMAP), Post Office Protocol (POP), and instant messaging (IM) protocol.

5. The communications system of claim 1 wherein the application session time includes at least one of a starting time associated with the application session and a time stamp associated with the application session.

6. The communications system of claim 1 wherein the second user identity includes at least one of a name of a user, an Internet service subscription identity, and a network login.

7. The communications system of claim 1 wherein the first host identity and the second host identity each include at least one of a respective Internet Protocol (IP) address and a Media Access Control (MAC) address.

8. The communications system of claim 1 wherein the storing further includes storing at least one of the first user identity, the second user identity associated with the first user identity, the first host identity, and the application session time.

9. The communications system of claim 1 wherein the processor further obtains user information associated with the second user identity, the user information including at least one of contact information, location information, and departmental information.

10. The communications system of claim 1 wherein the processor further generates a report including the association.

11. A processor-implemented method comprising:

conveying an application session between a first host and an application server, the first host communicating with the application server using an application session, the application server provisioning an application;

ascertaining a first host identity associated with the first host, a first user identity associated with the application session, and an application session time associated with the application session;

receiving a second host identity associated with a second host, a second user identity associated with an access session, and an access session time associated with the application session, the second host communicating with the secure network using the access session, the access session time including a starting time and an ending time associated with the access session;

comparing the application session time and the access session time;

matching the first host identity with the second host identity, in response to the application session time being between the starting time and the ending time;

associating the first user identity and the second user identity using the matching; and storing the association.

12. The method of claim 11 wherein the application server is outside of the secure network.

13. The method of claim 11 wherein the application session is an authenticated access session and the access session is an authenticated access session.

14. The method of claim 11 wherein the application includes at least one of File Transfer Protocol (FTP), Simple Mail Transfer Protocol (SMTP), Internet Message Access Protocol (IMAP), Post Office Protocol (POP), and instant messaging (IM) protocol.

15. The method of claim 11 wherein the application session time includes at least one of a starting time associated with the application session and a time stamp associated with the application session.

16. The method of claim 11 wherein the second user identity includes at least one of a name of a user, an Internet service subscription identity, and a network login.

17. The method of claim 11 wherein the first host identity and the second host identity each include at least one of a respective Internet Protocol (IP) address and a Media Access Control (MAC) address.

18. The method of claim 11 wherein the storing further includes storing at least one of the first user identity, the second user identity associated with the first user identity, the first host identity, and the application session time.

19. The method of claim 11 further comprising obtaining user information associated with the second user identity, the user information including at least one of contact information, location information, and departmental information.

20. The method of claim 11 further comprising generating a report including the association.

21. A non-transitory computer-readable storage medium having embodied thereon a program, the program being executable by a processor to perform a method, the method comprising:

conveying an application session between a first host and an application server, the first host communicating with the application server using an application session, the application server provisioning an application;

ascertaining a first host identity associated with the first host, a first user identity associated with the application session, and an application session time associated with the application session;

receiving a second host identity associated with a second host, a second user identity associated with an access session, and an access session time associated with the application session, the second host communicating with the secure network using the access session, the access session time including a starting time and an ending time associated with the access session;
comparing the application session time and the access session time;
matching the first host identity with the second host identity, in response to the application session time being between the starting time and the ending time;
associating the first user identity and the second user identity using the matching; and
storing the association.

* * * * *